United States Patent
Demmeler

(10) Patent No.: US 6,378,960 B1
(45) Date of Patent: Apr. 30, 2002

(54) BRAKE SYSTEM FOR MOTOR VEHICLES

(75) Inventor: Thilo Demmeler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/689,749

(22) Filed: Oct. 13, 2000

(30) Foreign Application Priority Data

Oct. 13, 1989 (DE) ..................................... 199 49 258

(51) Int. Cl.$^7$ ................................................. B60T 8/60
(52) U.S. Cl. ..................... 303/155; 303/113.2; 303/188
(58) Field of Search .................................. 303/155, 112, 303/140, 144, 146, 139, 113.2, 188

(56) References Cited

U.S. PATENT DOCUMENTS

| | | | | |
|---|---|---|---|---|
| 5,255,962 A | * | 10/1993 | Neuhaus et al. | 303/188 |
| 5,809,444 A | * | 9/1998 | Hadeler et al. | 303/146 |
| 5,832,402 A | * | 11/1998 | Brachert et al. | 303/147 |
| 6,157,887 A | * | 12/2000 | Zittlau | 303/122.03 |
| 6,226,581 B1 | * | 5/2001 | Reimann et al. | 701/48 |

FOREIGN PATENT DOCUMENTS

| | | |
|---|---|---|
| DE | 40 22 671 | 1/1992 |
| DE | 40 24 811 | 2/1992 |
| DE | 40 30 724 | 4/1992 |
| DE | 196 24 795 | 1/1998 |

\* cited by examiner

Primary Examiner—Christopher P. Schwartz
Assistant Examiner—Mariano Sy
(74) Attorney, Agent, or Firm—Crowell & Moring LLP

(57) ABSTRACT

A motor vehicle brake system is provided having a defining unit for determining the driver's desire to brake, an observation unit for determining the desired vehicle handling and the actual vehicle handling, and a central controller which, as a function of output signals of the defining unit and of the observation unit, determines desired wheel quantities for wheel-selective controlling of the individual brake actuators of the vehicle wheels. The desired wheel quantities are the desired wheel force and the desired wheel slip. A force-slip controller mounted at the vehicle wheel is connected upstream of each brake actuator and receives as input signals at least the desired wheel force from the central controller, the desired wheel slip from the central controller, the wheel reference speed from the central controller, the measured actual wheel force, and the measured actual wheel slip or the measured actual wheel rotational speed, for calculating the actual wheel slip. Either a wheel slip control or a wheel force control is carried out as a function of at least one operating parameter.

3 Claims, 2 Drawing Sheets

BRAKE SYSTEM FOR MOTOR VEHICLES

BACKGROUND AND SUMMARY OF THE INVENTION

This application claims the priority of German Application No. 199 49 258.1, filed Oct. 13, 1999, the disclosure of which is expressly incorporated by reference herein.

The invention relates to a brake system for motor vehicles and, more particularly, to a brake system for motor vehicles having a defining unit for determining the driver's desire to brake, an observation unit for determining the desired vehicle handling and the actual vehicle handling, and a central controller which, as a function of the output signals of the defining unit and of the observation unit, determines desired wheel quantities for the wheel-selective controlling of the individual brake actuators of the vehicle wheels.

A brake system of this type is known, for example, from German Patent Document DE 197 42 988. This known brake system includes a brake at each of its four wheels, which is actuated by one electrically controlled brake actuator or control element respectively. The brakes are actuated, on the one hand, when the driver of the motor vehicle makes a braking torque demand by way of a brake pedal unit and, on the other hand, when additional brake torque demands are present because of sensor signals of additional braking functions (such as the TCS (Traction Control System) or the DSC (Driving Stability Control).

The driver's desire to brake is determined by a defining unit which consists of a system of three computers and several sensors which are mounted on the brake pedal. As a result of the multiple redundancy, an error-tolerant design of the basic brake is achieved. By analyzing additional driving dynamics sensors, the desired vehicle handling as well as the actual vehicle handling is determined in an observation unit. Thus, so-called higher brake functions are implemented. In this case, the observation unit may be integrated in the defining unit. If the higher brake functions corresponding to the prior art are designed to be free of errors, these can also be distributed to fewer than three computers.

The optional wheel-selective operation of the brake actuators or the control elements is carried out by a central controller—the so-called central control—as a function of the desired vehicle handling and of the actual vehicle handling. In this case, the observation unit and the defining unit may be integrated in the central controller.

Furthermore, non-prior art brake control systems are also known by the assignee of the present invention that have not yet been published. In these, decentralized force controllers are provided which are mounted on each wheel. By means of these brake control systems, the brake force control performs a cascade control, on the one hand, by the overriding central controller and, on the other hand, by the subordinate force controllers. Because, in this case, only desired forces are to be transmitted to the brake actuators, the control of the wheel slip continues to take place in the central controller. For this purpose, for example, by way of a communication network, first the actual wheel speeds must be exchanged; then the control quantities must be calculated; and these must then be sent back to the wheel units. The additional data transmission time adds up to idle control time and impairs the control quality of the slip control. This, in turn, significantly influences the braking distance, the vehicle stability, as well as the comfort.

It is an object of the invention to improve a brake system of the above-mentioned type such that the control quality of the brake system is increased, the idling control time is reduced, and the safety of the vehicle is thereby improved.

This object is achieved by brake system for motor vehicles having a defining unit for determining the driver's desire to brake, an observation unit for determining the desired vehicle handling and the actual vehicle handling, and a central controller which, as a function of the output signals of the defining unit and of the observation unit, determines desired wheel quantities for the wheel-selective controlling of the individual brake actuators of the vehicle wheels. The desired wheel quantities are the desired wheel force ($F_{desired\ i}$) and the desired wheel slip ($S_{desired\ i}$) A force-slip controller ($8i$) which is mounted on the vehicle wheel ($10i$), is connected in front of each brake actuator ($9i$). The force-slip controller ($8i$) receives as input signals at least the desired wheel force ($F_{desired\ i}$) from the central controller (3), the desired wheel slip ($S_{desired\ i}$) from the central controller (3), the wheel reference speed from the central controller (3), the measured actual wheel force ($F_{actual\ i}$) directly and the measured actual wheel slip ($S_{actual\ i}$) directly or the measured actual rotational wheel speed, for calculating the actual wheel slip ($S_{actual\ i}$). As a function of at least one operating parameter, the brake system carries out either a wheel slip control or a wheel force control. Advantageous further developments of the invention are described herein.

The brake system for motor vehicles according to the invention has a defining unit for determining the driver's desire to brake, an observation unit for determining the desired vehicle handling and the actual vehicle handling, and a central controller which, as a function of the output signals of the defining unit and of the observation unit, determines desired wheel quantities for the wheel-selective controlling of the individual brake actuators of the vehicle wheels. The desired wheel quantities are the desired wheel force and the desired wheel slip. A force-slip controller mounted on the vehicle wheel is connected in front of each brake actuator or control element. For calculating the actual wheel slip, a wheel reference speed is provided to the force-slip controller by the central controller. This wheel reference speed largely corresponds to the speed of the free-rolling wheel. In the simplest case, this is the vehicle reference speed which is formed in the central controller.

Each force-slip controller receives as input signals at least the desired wheel force from the central controller, the desired wheel slip from the central controller, the wheel reference speed from the central controller, the measured actual wheel force, and the measured actual wheel slip or the measured actual wheel speed for determining the actual wheel slip. As a function of at least one operating parameter, the force-slip controller carries out either a wheel slip control or a wheel force control.

Preferably, the wheel force control is carried out instead of a wheel slip control when the vehicle speed falls below a defined threshold value and/or when the desired wheel slip falls below a defined threshold value.

This introduction according to the invention of a cascade control with a subordinate slip and force controller in the wheel units is such that the transmission behavior of the brake actuator is modeled exclusively in the pertaining wheel unit.

As a result of the invention, improved slip control quality is achieved because of shorter idle control times by a faster reversing when entering slips. Furthermore, the components can be optimally assembled because, first, the functionality and the software of the central controller is not influenced by the used actuators and, secondly, the combination of different actuators (hydraulic, electromechanical) is possible.

Thirdly, the physically oriented interface is always very suitable for linking an entire vehicle controller to subordinate control devices in a distributed control system. Furthermore, there is a very good independent evaluation possibility and comparability of various brake actuators and their control quality in the overall system. Finally, for increasing the availability, it is possible to prevent locking as a wheel-type fall-back plane.

Other objects, advantages and novel features of the present invention will become apparent from the following detailed description of the invention when considered in conjunction with the accompanying drawings.

DETAILED DESCRIPTION OF THE DRAWINGS

Figure 1:
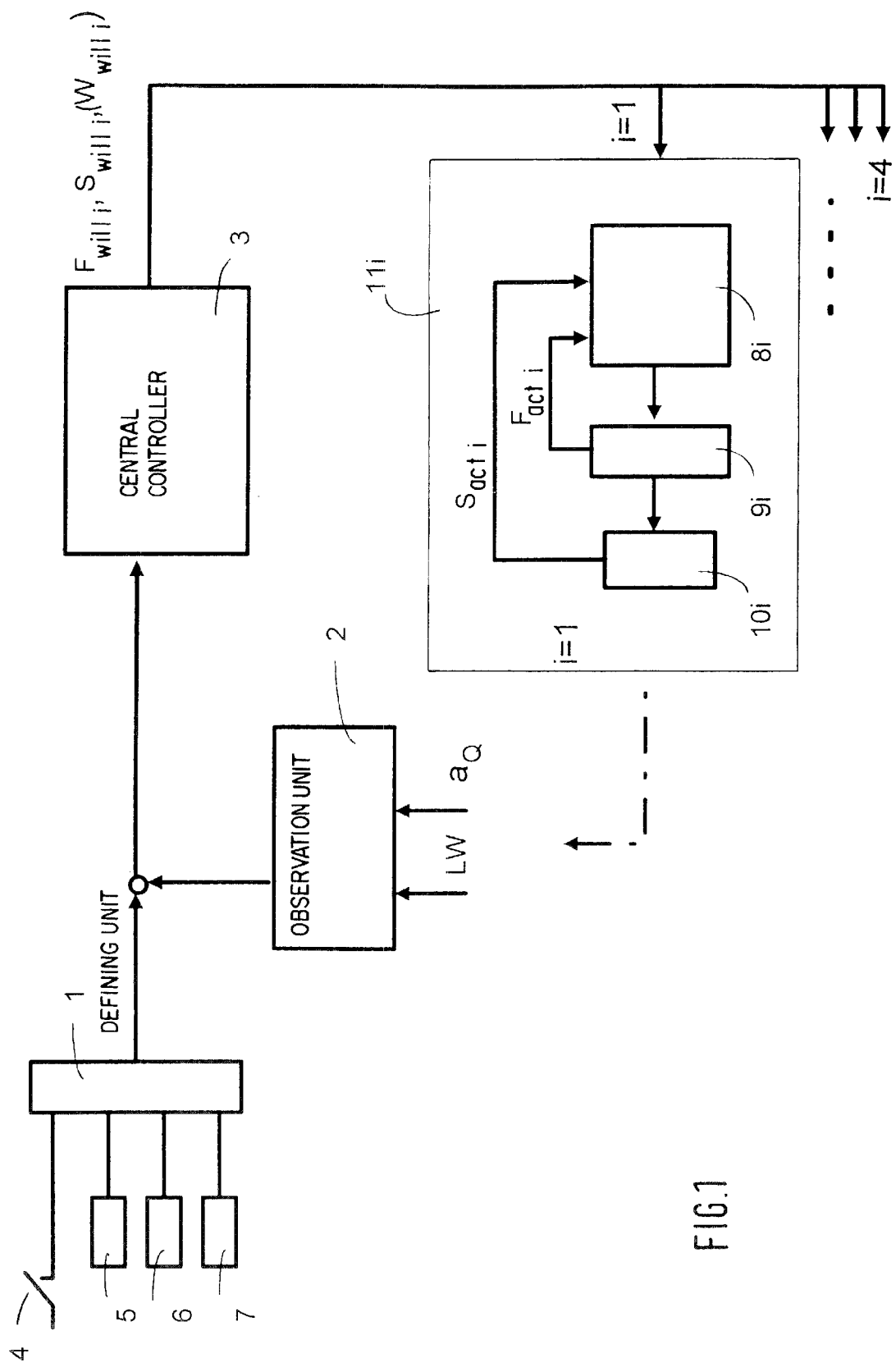
FIG. 1 is an overall view of the individual components of the brake control system according to the invention.

FIG. 1 is an overall representation of the individual components of the brake control system according to the invention.

Input quantities of a defining unit 1 are, for example, the signals of the sensors 4 to 7, these signals sensing the driver's desire to brake. Acceleration demands or deceleration demands may also be fed by a driver assist system and not directly by the driver.

In a vehicle observation system 2, to which, for example, at least the steering angle LW and the lateral vehicle acceleration $a_Q$ are provided as input signals, the vehicle condition quantities or the desired vehicle handling and the actual vehicle handling are detected.

As a function of the desired vehicle handling and of the actual vehicle handling, desired wheel quantities, which may be different for each vehicle, are computed in a central computer unit 3. These desired wheel quantities are the desired wheel force $F_{desired\ i}$, the desired wheel slip $S_{desired\ i}$ and, optionally, additional wheel-individual quantities, such as the desired spindle path $W_{desired\ i}$, i being equal to 1, 2, 3 or 4 for a vehicle with 4 wheels, and with 4 wheel units therefore being 11i. The desired wheel quantities are transmitted to all wheel units 11i, for example, by way of a bus communication network.

Each wheel unit 11i consists of a force-slip controller 8i, a brake actuator 9i with a force sensor and a wheel 10i with a rotational speed sensor. At least the actual rotational wheel speed, by means of which the actual wheel slip $S_{actual\ i}$ is computed, during a wheel slip control, or the actual wheel force $F_{actual\ i}$ during a wheel force control are measured by the corresponding sensors and are transmitted directly (thus not by way of the central controller unit 3) to the force-slip controller 8i. As a function of the type of control, which is selected particularly as a function of the vehicle speed, a subordinate wheel-individual control, which is independent of the central controller unit 3, takes place in the force-slip controller 8i. This control, in turn, affects the vehicle condition quantities which are detected in the observation unit 2 (for direction of effect, compare dash-dotted arrow) and are transmitted to the central controller unit 3.

Optionally, additional wheel-individual operating quantities can be sent from the central controller unit 3 to each of the wheel units 11i, such as the normal wheel force or the coefficient of friction. Like data, such as the measured actual wheel quantities, may be sent directly from each wheel unit 11i to the central controller unit 3.

The invention is based, among other things, on the basic consideration of torques and moments at the wheel and at the interface between the vehicle and the wheel:

The wheel brake primarily affects the longitudinal forces at the wheel. The longitudinal velocity of the wheel is measured by means of the known ABS sensors. The measuring of the lateral velocity of the wheel requires extremely high expenditures and takes place at most in the test operation.

For the interface definition of the brake control system according to the invention, the longitudinal force-slip behavior of a wheel is therefore considered, as also customary in the case of ABS systems. The longitudinal force-slip behavior is determined by a differential equation which is a result of the balance of torques and moments at the wheel:

$$M_{drive} + M_{brake} + M_{road} + M_{wheel\ inertia} = 0$$

$$M_{drive} + F_{brake} - C_{brake} + F_{wheel\ contact} \cdot \tau_{dyn} \cdot \mu + Q \cdot dw/dt = 0$$

wherein

| | | |
|---|---|---|
| $M_{drive}$ | = | the torque at the wheel supported by way of the drive shafts |
| $M_{brake}$ | = | the braking torque acting upon the wheel |
| $M_{road}$ | = | the torque acting upon the road |
| $M_{wheel\ inertia}$ | = | the moment of inertia of the wheel |
| $F_{brake}$ | = | the braking force acting upon the wheel |
| $C_{brake}$ | = | brake constant (as a function of the brake condition) |
| $F_{wheel\ contact}$ | = | normal wheel force (as a function of the dynamic wheel load) |
| $\tau_{dyn}$ | = | the dynamic wheel rolling radius |
| $\mu$ | = | coefficient of friction (as a function of the road) |
| Q | = | the (almost constant) moment of inertia of the wheel (as a function of the mass and of the shape of the wheel), and |
| dw/dt | = | the wheel acceleration (as a function of the balance of moments and torques at the wheel) |

Figure 2:
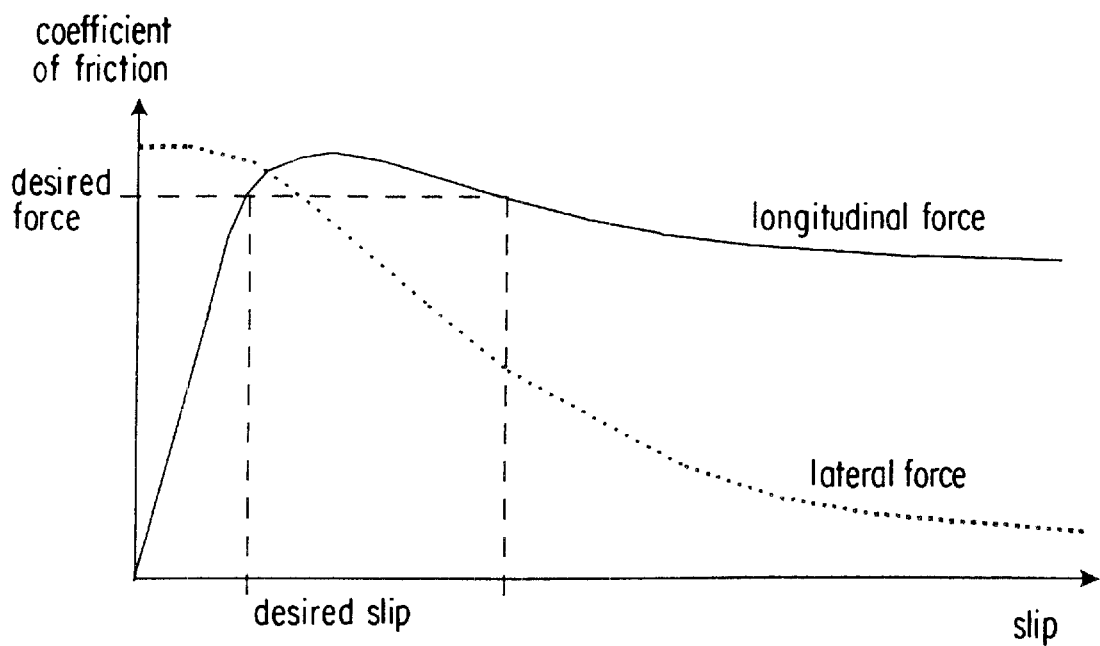
FIG. 2 is a view of the coefficient of friction-slip curve in conjunction with a basic view of the torques and moments.

FIG. 2 illustrates the characteristic relationship between the coefficient of friction and the (wheel) slip by means of the so-called $\mu$-slip curve. FIG. 2 shows the coefficient of friction as well as the longitudinal force and the lateral force as a function of the slip. The longitudinal force, which is finally applied to the inside of the tire contact area, is obtained from the utilization of the coefficient of friction $\mu$.

The wheel force or the braking force at the wheel (F) and the wheel slip (S), which are both measured, are basically available as the control input for a, for example, electromechanical brake actuator (with an actuator spindle). In addition, a path control of the actuator spindle could also take place by way of the spindle path (W).

In the case of a typical course of the $\mu$-slip curve, the working point is not clearly determined by only defining the longitudinal force, because the transmissible longitudinal force on most roads will drop again after reaching the maximum in the slip range of from 4% to 15%. Control interventions, during which a lateral force reduction takes place intentionally with the entering of high slips, therefore require a defining of the desired slip for a wheel slip control.

The use of the slip as a control input is, however, not possible when a vehicle is stopped. In addition, inaccuracies in the formation of the reference velocities required for calculating the slip affect the quality of the desired slip. This applies particularly at low vehicle speeds and for the stable portion of the $\mu$-slip curve, in which very small changes in the slip cause large changes of the longitudinal force. A wheel force control is preferred in this case.

Each wheel unit $11i$ with the brake actuator $9i$ therefore requires both desired quantities ($F_{desired\ i}$, $S_{desired\ i}$), which are used as a function of the situation. In the case of an optimal coordination, both control inputs converge in a working point so that no unsteadiness occurs during transitions. A change-over between the slip control and the wheel force control can originate from the central controller 3 or from the wheel unit $11i$.

The best control quality is achieved when all highly dynamic slip control operations are processed directly at the site in the wheel unit $11i$ by the force-slip controller $8i$. For this purpose, all dynamic control-relevant signals, particularly the actual wheel rotational speed, are measured directly in the wheel unit $11i$ and are supplied to the force-slip controller $8i$. The highly dynamic slip control operations include, for example, an ABS control during which, if possible, the wheel is held at the maximum of the $\mu$-slip curve.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake for motor vehicles, comprising:
   a defining unit which determines a driver's desire to brake;
   an observation unit which determines a desired vehicle handling and an actual vehicle handling;
   a central controller which, as a function of output signals from the defining unit and the observation unit, determines desired wheel quantities for wheel-selective control of individual brake actuators of vehicle wheels;
   wherein the desired wheel quantities are a desired wheel force and a desired wheel slip;
   a force-slip controller, mounted on a vehicle wheel, and connected in front of each brake actuator having a transmission behavior characteristic; and
   wherein said force-slip controller receives as input signals from the central controller at least the desired wheel force, the desired wheel slip and a wheel reference speed, and receives directly a measured actual wheel force and a measured actual wheel slip or measured actual wheel rotational speed for calculating an actual wheel slip, the transmission behavior characteristic of the brake actuator being modeled exclusively in the force-slip controller, such that as a function of at least one operating parameter, the force-slip controller carries out either a wheel slip control or a wheel force control.

2. The brake system according to claim 1, wherein the wheel force control is carried out instead of the wheel slip control when a speed of the vehicle falls below a defined threshold value.

3. The brake system according to claim 1, wherein the wheel force control is carried out instead of the wheel slip control when the desired wheel slip falls below a defined threshold value.

* * * * *